United States Patent

Sasao et al.

Patent Number: 5,110,562
Date of Patent: May 5, 1992

[54] LASER ISOTOPE SEPARATION APPARATUS

[75] Inventors: Nobuyuki Sasao; Hiromi Yamaguchi, both of Tokai, Japan

[73] Assignee: Doryokuro Kakunenryo Kaihatsu Jigyodan, Tokyo, Japan

[21] Appl. No.: 486,495

[22] Filed: Feb. 28, 1990

[30] Foreign Application Priority Data

Aug. 4, 1989 [JP] Japan .................. 1-202653

[51] Int. Cl.⁵ .............................................. B01J 19/08
[52] U.S. Cl. ........................... 422/186; 250/423 P; 359/245
[58] Field of Search ............ 204/157.2, 157.44; 250/423 P, 288; 350/374, 378; 307/425; 422/903, 186, 186.3; 372/21, 22, 27, 38, 69, 70; 359/245; 55/100

[56] References Cited

U.S. PATENT DOCUMENTS

| | | | |
|---|---|---|---|
| 3,740,552 | 6/1973 | Pressman | 55/100 |
| 3,959,649 | 5/1976 | Forsen | 250/288 |
| 3,973,926 | 8/1976 | Levi | 55/3 |
| 4,020,350 | 4/1977 | Ducas | 55/2 |
| 4,085,332 | 4/1978 | Fletcher et al. | 250/528 |
| 4,176,025 | 11/1979 | Chen et al. | 204/157.2 |
| 4,526,664 | 7/1985 | Feldman | 204/157.1 R |
| 4,584,072 | 4/1986 | Arisaw et al. | 250/423 P |
| 4,634,864 | 1/1987 | Lucatorto et al. | 250/282 |
| 4,734,579 | 3/1988 | Luartorto et al. | 250/282 |
| 4,786,478 | 11/1988 | Ahmed et al. | 422/186.03 |
| 4,793,907 | 12/1988 | Paisner et al. | 204/157.72 |
| 4,946,567 | 8/1990 | Michon et al. | 204/157.22 |

FOREIGN PATENT DOCUMENTS

0320386 6/1989 European Pat. Off. .
2315310 1/1977 France .

*Primary Examiner*—Brooks H. Hunt
*Assistant Examiner*—Ngoclan T. Mai
*Attorney, Agent, or Firm*—Armstrong, Nikaido, Marmelstein, Kubovcik & Murray

[57] ABSTRACT

The laser isotope separation apparatus utilizes the circularly-polarized light to selectively excite the isotopes to the first or the second excited level. In case where the isotope shift is equal to or smaller than the line width of the laser light, it can be selectively ionized and separated because the isotopes absorb the circularly-polarized light based on the angular momentum selection rule and are excited and the isotopes not excited according to the mass number of isotopes (or those having nuclear spin not equal to zero and equal to zero). The selective excitation by the angular momentum selection rule and the ionization are performed by 3 steps of excitation. Three excitation wavelengths are generated from two or more lasers, and the optical paths of these light beams are made to be in same length by optical delay circuit. Accordingly, even when the laser light source is pulse-operating, selective excitation and ionization can be performed. Also, because the first circularly-polarized laser light and the second circularly-polarized laser light are irradiated on the substance containing the gasified isotopes from opposite directions, Doppler effects of the moving atoms can be canceled each other vector-wise, and the separation efficiency is increased.

5 Claims, 8 Drawing Sheets

FIG. 4

ISOTOPE SEPARATION OF
NATURAL PALLADIUM

| ISOTOPE | NATURAL Pd | SEPARATION RESULTS |
|---------|------------|--------------------|
| 102     | 1.0 %      | 1.0 %              |
| 104     | 11.0 %     | 9.8 %              |
| 105     | 22.2 %     | 46.1 %             |
| 106     | 27.3 %     | 17.6 %             |
| 108     | 26.7 %     | 15.7 %             |
| 110     | 11.8 %     | 9.8 %              |

LASER ISOTOPE SEPARATION APPARATUS

BACKGROUND OF THE INVENTION

The present invention relates to a separation apparatus of the isotopes with different mass numbers, and more particularly to a laser isotbpe separation apparatus.

For example, natural palladium contains the isotopes with mass numbers 102 (1%), 104 (11%), 105 (22.2%), 106 (27.3%), 108 (26.7) and 110 (11.8%). The palladium in the insoluble residue from the reprocessing of spent fuel contains the isotopes of the mass number 107 by 18%, for example, in addition to the isotopes of the above mass numbers. There is strong demand on the effective method to selectively separate the isotopes of platinum group elements. (For example, only the palladium with mass number 107 is radioactive, and if this can be selectively removed, the palladium in the insoluble residue from the reprocessing of spent fuel can be effectively utilized as valuable resources.) Laser isotope separation method is known as a means to separate isotopes. By this method, the substance containing isotopes is gasified, and linearly-polarized laser light is applied to selectively excite only the desired isotopes by isotope shift. Further, laser beam is applied on the atoms selectively excited, and the ionized atoms are separated from the other neutral isotopes by means of the electrode applied with electric field or magnetic field.

Taking an example in uranium, the principle of the conventional laser isotope separation method is described below. In the schematical illustration of FIG. 8, when linearly-polarized laser light of $\lambda_1$ (~591 nm) is applied to the uraniums 235 and 238 on ground level, only uranium 235 absorbs light because of the isotope shift (280 milli cm$^{-1}$) and is excited to the first excited level, while uranium 238 does not absorb light and is not excited. When the linearly-polarized laser light of $\lambda_2$ (~563 nm) is applied on uranium 235, it is excited from the above excited level to the intermediate excited level. It is further excited to higher than the ionized potential (I.P.) by the third light ($\lambda_3 = 625$ nm) and is ionized. On the other hand, uranium 238 is not excited at all. Accordingly, in the gas containing ionized uranium 235 and neutral uranium 238, the former can be separated from the latter by means of the electrode applied with electric field or magnetic field.

Meanwhile, it is known that the isotope shift depends upon the mass number of the element as shown in the graph of FIG. 5. From the mass number of about 100 up, isotope shift increases with the increase of mass number due to volume effect of atoms, while the isotope shift increases due to mass effect of atoms when the mass number decreases. As it is evident from this graph, the isotope shift is very small near the palladium with mass number of 102 to 110. Actually, it is about 8 milli cm$^{-1}$. In contrast, the line width of laser light is about 30 milli cm$^{-1}$. Thus, when the method of FIG. 8 is applied on the element with mass number of about 100, the isotopes cannot be selectively excited because the isotope shift is smaller than the line width of laser light.

SUMMARY OF THE INVENTION

Therefore, it is the object of this invention to provide a new isotope separation apparatus, which eliminates the disadvantages of the conventional laser isotope separation method as described above. More particularly, it is to provide a laser isotope separation apparatus for the isotope, in which isotope shift is equal to or smaller than the line width of laser light.

To attain such object, the laser isotope separation apparatus according to the present invention is an apparatus, in which the isotope shift is equal to or smaller than the line width of laser light, the substance containing isotopes is gasified and laser light with the first wavelength is irradiated to excite only the isotopes with specific mass number or all isotopes to the first excited level, the laser light with the second wavelength is irradiated to excite all isotopes excited by the laser light with the first wavelength or only the isotopes with specific mass number to the second excited level, the laser light with the third wavelength is irradiated to ionize the isotopes on the second excited level, and the ionized isotopes are separated from the other neutral isotopes by the electrode applied with electric field or magnetic field, characterized in that two or more different lasers are pumped by the same pumping light source, that the wavelength of the laser light from at least one of the lasers is converted by non-linear optical effect, that the laser light with said first wavelength of the light beams having two or more wavelengths thus obtained is converted to the right-handed or left-handed circularly-polarized light by circular polarization converter, that the laser light with said second wavelength is converted to the right-handed or the left-handed circularly polarized light by a circular polarization converter, that the optical paths of these two are made to be in same length by optical delay circuit, and that said first circularly-polarized laser light and said second circularly-polarized laser light are irradiated on the substance, which contains gasified isotopes, from the opposite directions.

This apparatus is preferably arranged in such manner that the laser light with the third wavelength is generated by a third laser, which is different from the first and the second lasers pumped by the light from the same pumping light source.

In case the isotopes with different mass numbers in the isotopes to be separated are further separated, the laser light from ring dye laser with narrower line width than the isotope shift between these isotopes is amplified by one of the above two or more lasers, and the wavelength of this light is preferably converted by non-linear optical effect or it is used as the laser light with the first or the second wavelength without converting.

The apparatus can be arranged in such manner that it can be applied to palladium as the substance containing isotopes, whereby the laser light with the second wavelength can also be used as the laser light with the third wavelength, that the same pumping the light with wavelength of 1064 nm, that it is converted to the one-half of the wavelength, i.e. to 532 nm, by non-linear optical element and the first laser is pumped, that the light with wavelength of 552.6 nm is oscillated from the first laser, and this light is converted to one-half of the wavelength, i.e. to 276.3 nm, by non-linear optical effect and this is used as the laser light with the first wavelength, that the laser light from said pulse operating YAG laser is converted to ⅓ of the wavelength, i.e. to 355 nm, by non-linear optical element and the second laser is pumped, and that the light with wavelength of 521 nm is oscillated from the second laser and this is used as the laser light with the second and the third wavelengths.

The laser isotope separation apparatus according to this invention can also be applied in the cases where the substance containing the isotopes is Ca, Zn, Sr, Cd, Ba, Hg, Yb, C, Si, Ge, Sn, Sn, Sm, Pb or Pu.

The laser isotope separation apparatus according to this invention utilizes the circularly-polarized light to selectively excite the isotopes to the first or the second excited level. Even in case of the isotope, in which the isotope shift is equal to or smaller than the line width of the laser light, it can be selectively ionized and separated because there are the isotopes absorbing the circularly-polarized light based on the angular momentum selection rule and being excited and the isotopes not excited according to the mass number of isotopes (or those having nuclear spin not equal to zero and equal to zero). The selective excitation by the angular momentum selection rule and the ionization are performed by 3 steps of excitation. Three excitation wavelengths are generated from two or more lasers pumped by the light from the same pumping light source, and the optical paths of these light beams are made to be in same length by optical delay circuit. Accordingly, even when the laser light source is pulse-operating, selective excitation and ionization can be performed. Also, because the first circularly-polarized laser light and the second circularly-polarized laser light are irradiated on the substance containing the gasified isotopes from opposite directions, Doppler effects of the moving atoms can be canceled each other vector-wise, and the separation efficiency is increased. It is not necessary to optically overlap both light beams in advance, and the circularly-polarized light can be efficiently utilized.

BRIEF DESCRIPTION OF THE DRAWINGS

FIG. 4 shows the results of separation of natural palladium isotopes by the laser isotope separation apparatus of FIG. 1;

DESCRIPTION OF PREFERRED EMBODIMENTS

Figure 2:
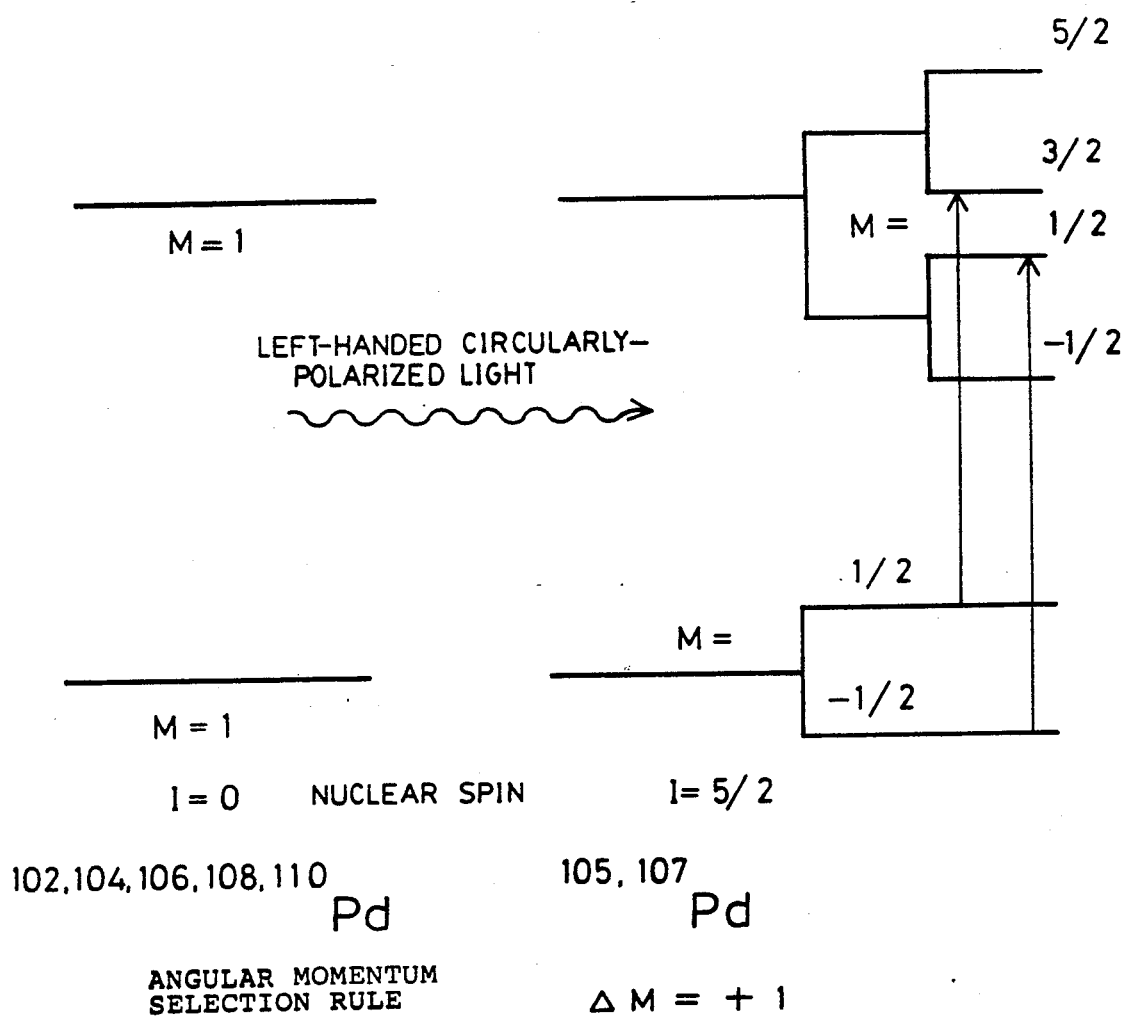
FIG. 2 is a drawing to explain the excited level of palladium isotopes and its angular momentum selection rule.

Before explaining the embodiments of this invention, the principle of the isotope separation of the laser isotope separation apparatus according to this invention is described. The principle used in this invention is the laser isotope separation method utilizing the angular momentum selection rule, and it is based on the angular momentum selection rule of the atoms to the absorption of the circularly-polarized light. For example, if palladium is taken as an example, in FIG. 2 where the status of angular momentum quantum number on its energy level is schematically illustrated, nuclear spin I is zero in the palladiums having even mass numbers 102, 104, 106, 108 and 110. Accordingly, there is no hyperfine structure at energy level. The total angular momentum quantum number M at the first intermediate excited level is 1, and total angular momentum quantum number M at the second intermediate excited level is also 1. Between these levels, transition does not occur when the circularly-polarized light enters. Namely, it is known from the angular momentum selection rule that transition occurs only between the energy level where the variation $\Delta M$ of total angular momentum quantum number when the left-handed circularly-polarized light enters is +b 1 and the variation $\Delta M$ of total angular momentum quantum number when the right-handed circularly-polarized light enters is $-1$. However, because there is no variation of total angular momentum quantum number between the levels of $M=1$ and $M=1$, no excitation occurs by absorbing the circularly-polarized light. On the other hand, nuclear spin I is 5/2 and is not zero in palladiums having odd mass number of 105 and 107. Therefore, nuclear spin exerts influence on energy condition of the atoms, and the complicated hyperfine structure as shown is generated on energy level. When left-handed circularly-polarized light enters, the variation $\Delta M = +1$ of total angular momentum quantum number occurs between the levels shown by arrow in the figures. Transition occurs and it is excited. Therefore, by irradiating the left-handed circularly-polarized light to the gas containing the palladiums 102, 104, 105, 106, 107, 108 and 110, the palladium 105 and 107 can be selectively ionized, and the ionized isotopes can be separated by the electrode applied with electric field or magnetic field.

Figure 3:
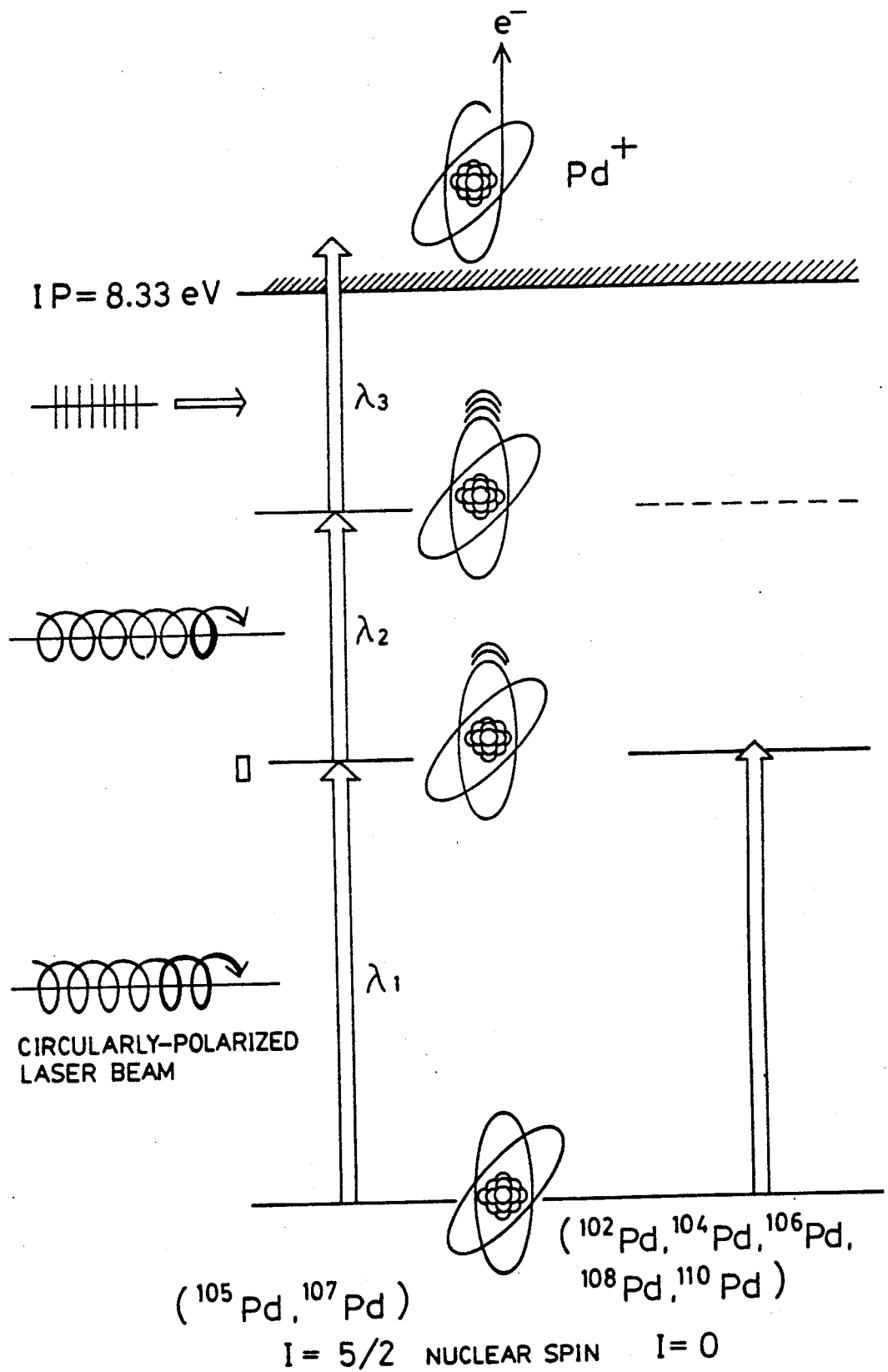
FIG. 3 is a schematical illustration of the laser isotope separation method of palladium to explain the principle of this invention.
Figure 5:
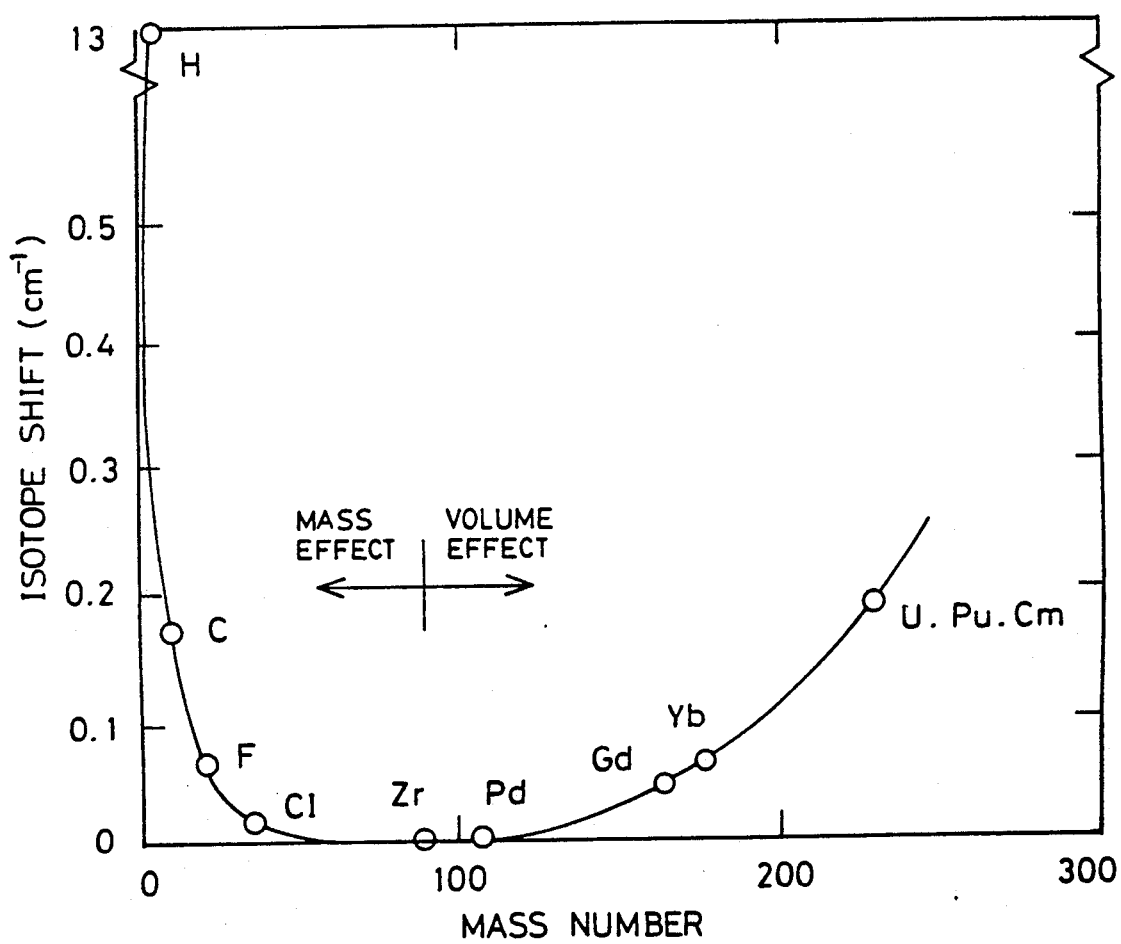
FIG. 5 is a diagram to show the relationship between the isotope shift of the elements and the mass number.
Figure 6:
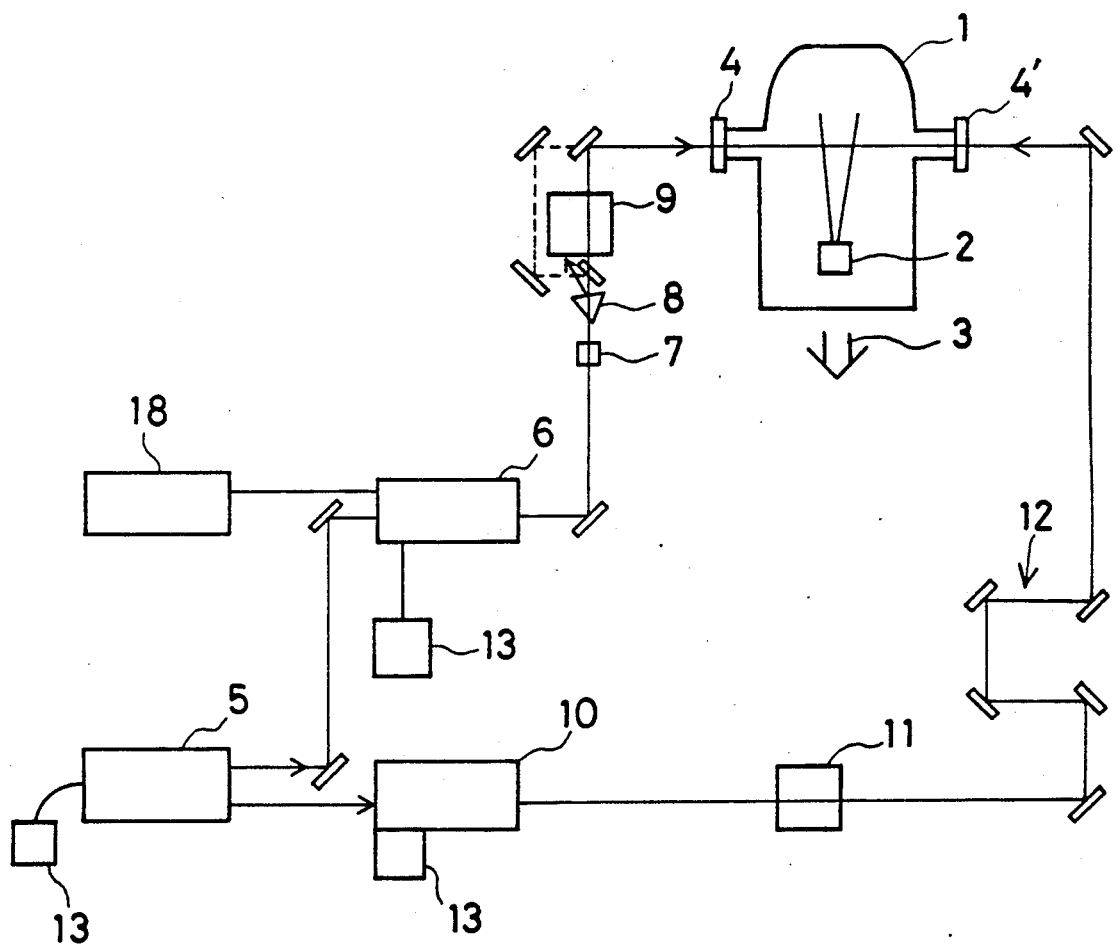
FIG. 6 and FIG. 7 are the variants of the optical path of FIG. 1.

The laser isotope separation method of palladium according to the above principle is as schematically given in FIG. 3. Namely, when the laser light for the first selective excitation of the left-handed circularly-polarized light having wavelength $\lambda_1$ ($\sim$276 nm) is applied to the palladium group having odd mass numbers of 105 and 107 at ground level and to the palladium groups having even mass numbers of 102, 104 106, 108 and 110, all atoms of two groups are excited to the first excited level. When the laser light for the second selective excitation of the left-handed circularly-polarized light having wavelength $\lambda_2$ ($\sim$521 nm) is applied to the atoms of these two groups thus excited, only the group with odd mass numbers absorbs the light according to the principle of FIG. 2 and is excited to the intermediate excited level, and the palladium group with even mass number does not absorb the light and is not excited to the intermediate excited level. Further, the laser light for ionization of the left-handed circularly-polarized light of $\lambda_3$ ($\sim$521 nm) (which is not necessarily the circularly-polarized light) is applied to the palladium group having odd mass number, and it is excited to higher than the ionization potential (I.P.) and ionized. On the other hand, the palladium group with even mass number is not excited. Thus, in the gas containing the ionized palladiums 105 and 107 and also neutral palladiums of 102, 104, 106, 108 and 110, the former can be separated from the latter by the electrode applied with electric field or magnetic field.

Figure 1:
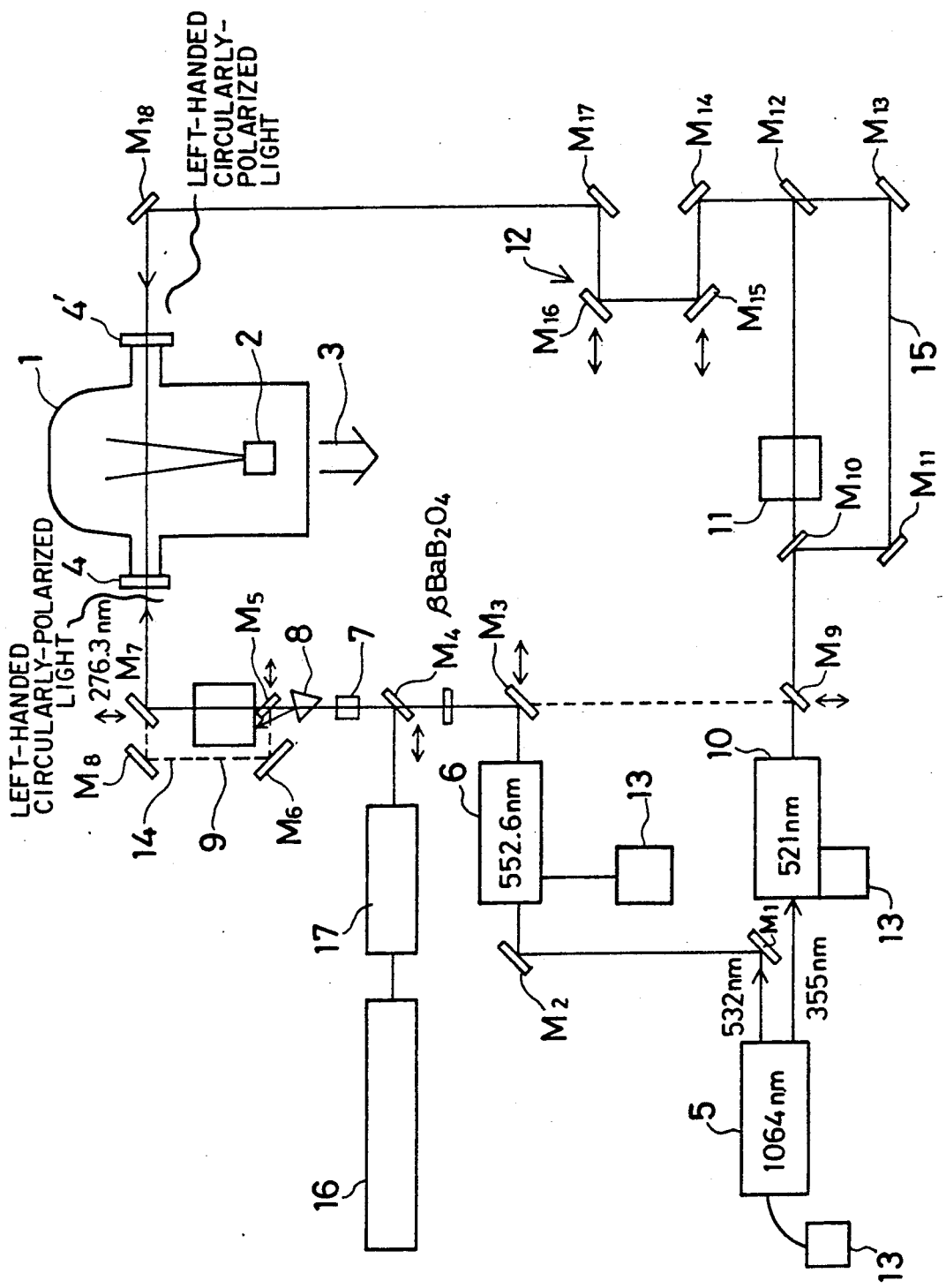
FIG. 1 is a diagram to show the optical path of the Embodiment 1 of the laser isotope separation apparatus according to the present invention.

FIG. 1 shows an optical path of the Embodiment 1 of the laser isotope separation apparatus according to this invention to execute the laser palladium isotope separation method of FIG. 3. This apparatus primarily consists of vacuum chamber 1, crucible 2, exhaust apparatus 3, entrance window 4, YAG laser 5, dye laser 6, second higher harmonics generating crystal 7, circularly-polarized light generator 9, dye laser 10, circularly-polarized light generator 11, and optical delay circuit 12. Natural palladium specimen or the palladium specimen collected from the insoluble residue of the reprocessing of spent fuel is placed into a crucible 2 in a vacuum chamber 1, and the vacuum chamber 1 is turned to vacuum by the exhaust apparatus 3. Electron beam is applied on the specimen obliquely from above by an electron gun (not shown), and palladium vapor is generated inside the vacuum chamber 1. In the vacuum chamber 1, the entrance windows 4 and 4' are provided at the opposite positions to let the laser light enter. As described later, the circularly-polarized light is introduced through the entrance windows 4 and 4', and these windows 4 and 4' are arranged at an angle of 80° to the entering direction of the laser light in order to introduce the circularly-polarized light efficiently into the vacuum chamber 1. Laser light is generated by synchronizing the laser light for the first selective excitation and the laser light for the second selective excitation through pumping of the dye lasers 6 and 10 by the pulse operating YAG laser 5 for pumping. First, to generate the laser light with wavelength $\lambda_1$ of FIG. 3, the light with wavelength 1064 nm coming from YAG laser 5 is turned to the light with $\frac{1}{2}$ of the wavelength, i.e. 532 nm, by non-linear optical element (not shown). Pumping the dye laser 6 by this light, the light with wavelength 552.6 nm is emitted. This light is further applied on the second higher harmonics generating crystal 7, and the light having $\frac{1}{2}$ of the wavelength, i.e. 276.3 nm ($\lambda_1$) is emitted. The light with unnecessary wavelength is removed by spectral prism 8, and it is turned to the left-handed circularly-polarized light by the circularly-polarized light generator 9 comprising $\frac{1}{4}$ wave plate. This is irradiated on the specimen vapor through the entrance window 4 as the laser light for the first selective excitation and it is excited to the first intermediate excited level. To generate the laser light with wavelength of $\lambda_3$ of FIG. 3, the light with wavelength 1064 nm coming from YAG laser is turned to 1/3 of the wavelength, i.e. to 355 nm, by non-linear optical element (not shown). (Frequency is tripled.) After pumping dye laser 10 by this light, the light with wavelength 521 nm is emitted. This light is turned to the left-handed circularly-polarized light by the circularly-polarized light generator 11 comprising $\frac{1}{4}$ wave plate. Passing through the optical delay 12 consisting of the reflecting mirrors $M_{14}$–$M_{17}$ with $M_{15}$ and $M_{16}$ adjustable to the arrow directions, the optical path is aligned to irradiate the specimen at the same time with the laser light for the first selective excitation ($\lambda_1$). (It is necessary to bring to the higher excitation status while it is excited.) It is then irradiated on the specimen vapor as the laser light for the second selective excitation through the entrance window 4', and only the palladiums having odd mass numbers of 105 and 107 are selectively excited to the second intermediate excited level. The laser light with this wavelength $\lambda_2$ also serves as the laser light for ionization with wavelength $\lambda_3$ of FIG. 3. Palladiums with odd mass number excited to the second intermediate excited level are ionized at the same time following to this excitation. The ionized palladiums having mass numbers of 105 and 107 are separated from the non-ionized palladiums with even odd mass numbers by the electrode (not shown) applied with electric field or magnetic field.

The optical path with wavelength $\lambda_2$ passing through the removable reflecting mirrors $M_8$ and $_,7$ is an experimental optical path to let the laser light for the second selective excitation from the same direction as the laser light for the first selective excitation with wavelength $\lambda_1$, and it is not necessarily required. When the laser light for the first selective excitation and the laser light for the second selective excitation are irradiated from the same direction by selecting such optical path, Doppler effect of the moving atoms works vector-wise, and the separation efficiency is decreased. However, the laser light for the first selective excitation and the laser light for the second selective excitation are irradiated from entirely opposite directions, as in the case of the present invention. Doppler effects of the moving atoms can be canceled each other vector-wise, and the separation efficiency is increased. If the laser light for the first selective excitation and the laser light for the second selective excitation are irradiated from the opposite directions, it is very advantageous because there is no need to optically overlap both light beams in advance. It is practically impossible to overlap two circularly-polarized light beams efficiently without loss and without giving influence on the polarization condition, whereas such problem can be solved by the arrangement according to this invention. It is preferable to irradiate the laser light for the first selective excitation and the laser light for the second selective excitation at the crossing angle of 0°, i.e. perfectly coaxially from the opposite directions, but it is necessary to adjust so that the crossing angle is 1° or less.

In FIG. 1, the bypass optical path 15 passing through the semi-transparent mirror $M_{10}$, the fixed reflecting mirrors $M_{11}$ and the $M_{13}$ and the semi-transparent mirror $M_{12}$ is used when the laser light ($\lambda_3$) for ionization is irradiated without circularly-polarizing, and this optical path is not necessarily required. Further, the optical path consisting of argon ion laser 16, ring dye laser 17, removable reflecting mirrors $M_4$ and $M_5$, and the fixed reflecting mirrors $M_6$ and $M_8$ is for the experiment to study hyperfine structure on the excited level of FIG. 2, and this is not necessarily required. In the figure, $M_1$, $M_2$, $M_3$ and $M_{16}$ are the fixed or the removable reflecting mirrors, and the control unit of each laser is denoted by the number 13.

FIG. 4 shows the results of the separation of natural palladium isotopes by such laser separation apparatus. The conditions for the separation are as follows:

The volume of palladium crucible was 3 cc, the emission current of the heating electron gun was 100 mA, and the evaporation surface temperature was 1850° K. The vapor of palladium was made parallel by passing through collimator hole of 5 mm×20 mm. Atom density at the portion irradiated by laser light was $6.3 \times 10^9$ atoms/cm³. Further, the laser light with wavelength $\lambda_1$ had wavelength of 276.3 nm, pulse width of 10 nsec, iteration of 10 Hz, beam diameter of 3 mm, and power density of 64 W/cm³. The laser light with wavelength $\lambda_2$ had wavelength of 521 nm, pulse width of 10 nsec, iteration of 10 Hz, beam diameter of 3 mm, and power density of 375 kW/cm³.

As it is evident from FIG. 4, the concentration of palladium 105 (Palladium 107 does not exist in nature.) is extremely increased. By repeating this separation procedure, the concentration of palladium 105 is further increased.

It is necessary in the apparatus of FIG. 1 to separate palladium 105 and 107 from each other, which are contained in the palladium collected from insoluble residue of the reprocessing of spent fuel. The isotope shift between these isotopes is about 8 milli cm$^{-1}$. On the other hand, the line width of the ring dye laser excited by argon ion laser is about 1 milli cm$^{-1}$, and this is narrower than the above isotope shift. Thus, it is possible to selectively excite only palladium 107 from the palladiums 105 and 107 having nuclear spin not at zero. Therefore, if ring dye laser 18 excited by argon ion laser is added to the apparatus of FIG. 1 as shown in FIG. and the light from this ring dye laser 18 is irradiated to the dye laser 6 as seed light, the light from the ring dye laser 18 is amplified. Because YAG laser 5 is oscillating pulse-wise and is pumping the dye laser 6, the light amplified by the dye laser 6 is pulsed. This light is then converted to the left-handed circularly-polarized light by the circularly-polarized light generator 9. By this light, palladium 107 can be selectively excited, and it is possible to efficiently separate palladium 105 from palladium 107.

Figure 7:
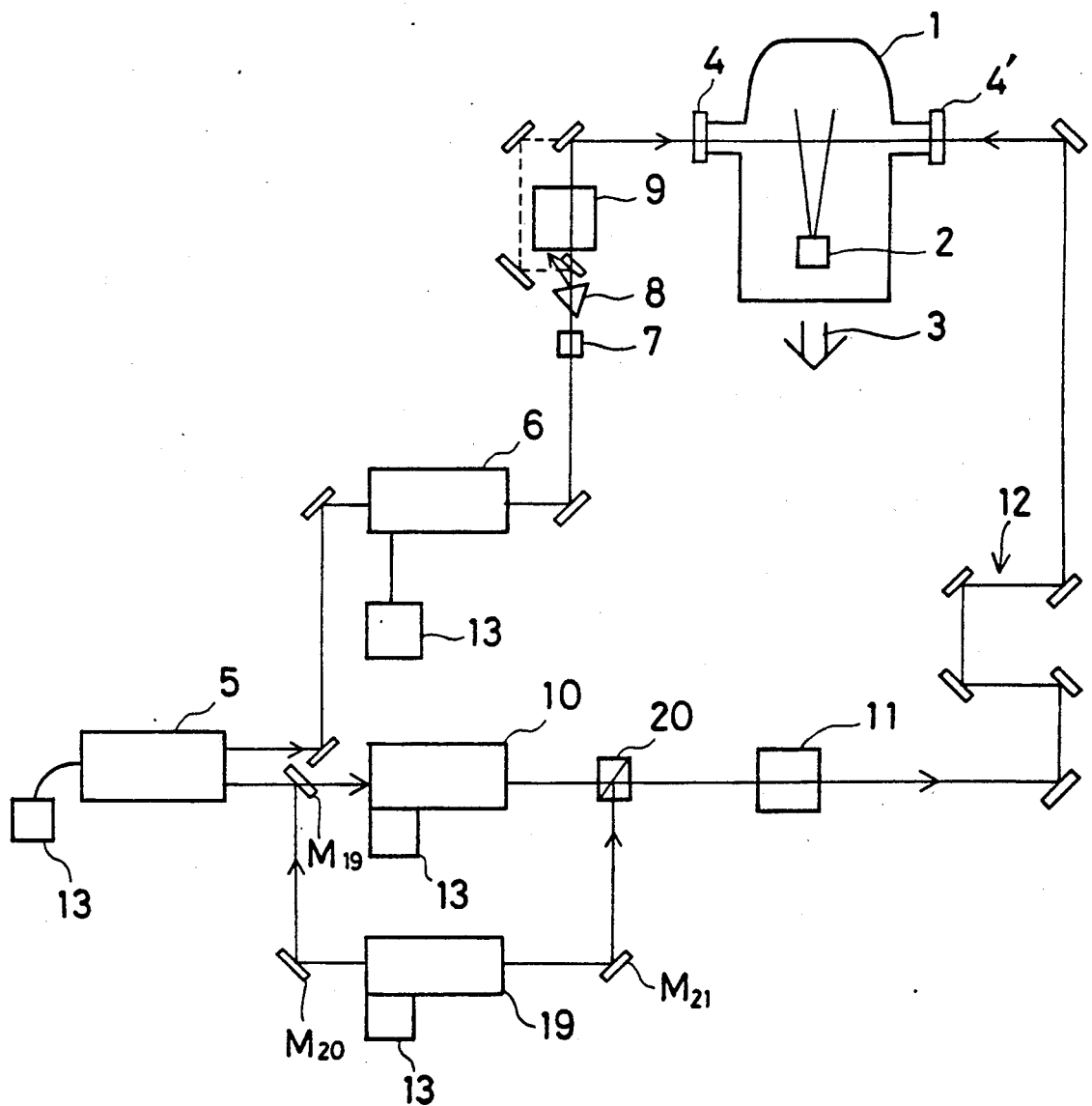
Figure 8:
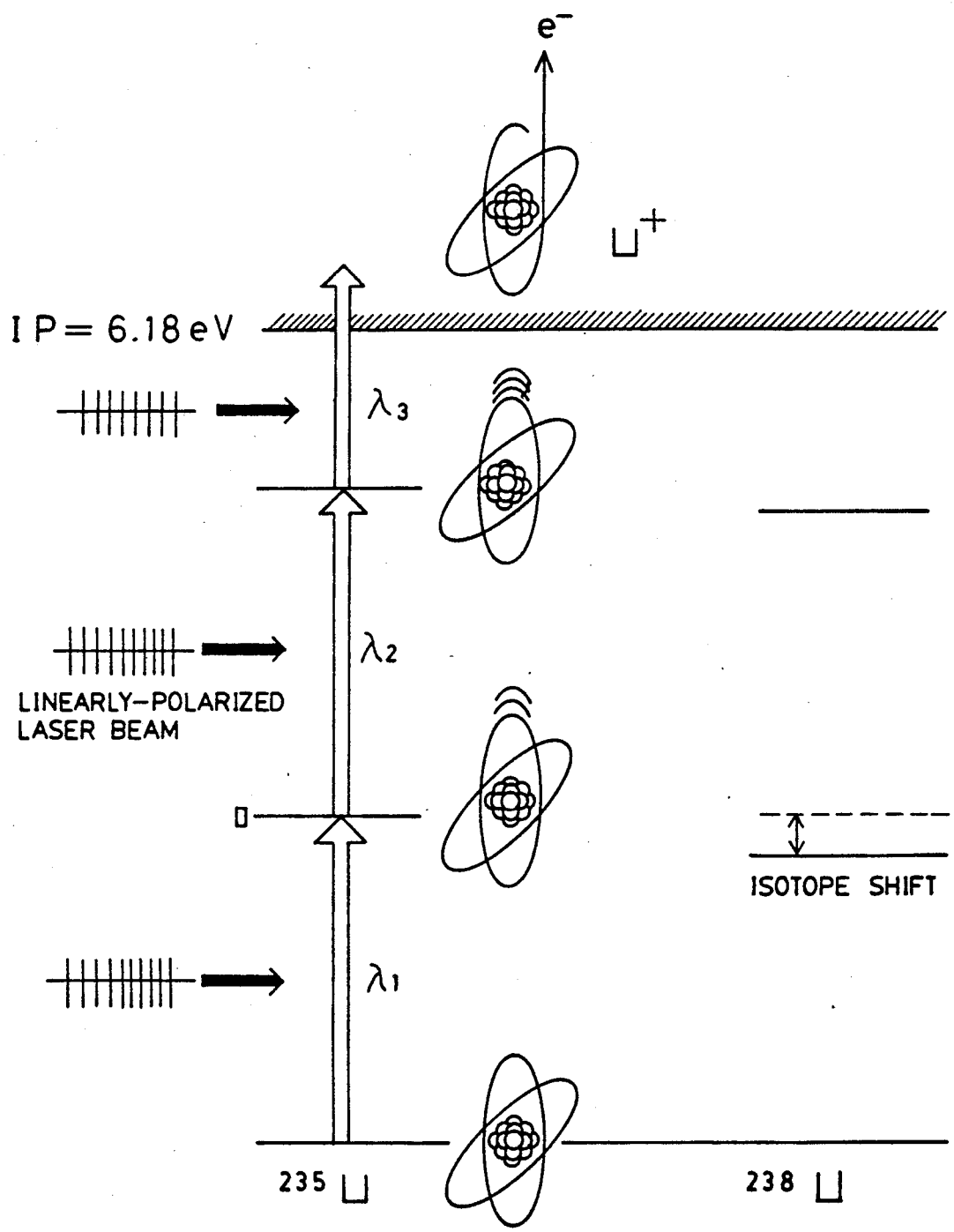
FIG. 8 is a schematical illustration of the conventional laser isotope separation method of uranium.

In the apparatus of FIG. 1, 2-wavelength 3-step system is adopted where the laser light with the second wavelength also serves the laser light for ionization. In some cases, ionization efficiency is decreased in this system. In such case, the third laser 19 for ionization should be added as shown in FIG. 7. By pumping the third laser 19 through the pulse operating laser 5 for pumping, the laser light for ionization can be generated, in wavelength and intensity, independently from and in synchronization with the laser light with the second wavelength. In this case, the laser light for ionization does not have to be the circularly-polarized light. Before the laser light with the second wavelength and the laser light for ionization enter the circularly-polarized light generator 11, the linearily-polarized lights of both lights are bonded together with the polarization plane varying by 90° from each other by polarization beam coupler 20. Then, only the laser light with the second wavelength should be converted to the circularly-polarized light by passing through the circularly-polarized light generator 11. ($\frac{1}{4}$ wave plate of the circularly-polarized light generator 11 can convert only one of two wavelengths to the circularly-polarized light if two wavelengths are separated from each other.) In the figure, $M_{18}$ is a fixed semi-transparent mirror, and $M_{20}$ and $M_{21}$ are the fixed reflecting mirrors.

In the above, description has been given on the laser isotope separation apparatus according to this invention where the isotopes of palladium with nuclear spin not at zero are separated from the other isotopes, whereas this apparatus can be applied for the separation of the isotopes of the elements other than palladium with nuclear spin not at zero such as Mg, Ca, Zn, Sr, Cd, Ba, Hg, Yb, C, Si, Ge, Sn, Sm, Pb, Pu, etc. from the other isotopes.

As described already, the laser isotope separation apparatus based on this invention utilizes the circularly-polarized light to selectively excite the isotopes to the first or the second excited level. Because there are the isotopes absorbing the circularly-polarized light and excited according to the annular momentum selection rule of quantum mechanics and those isotopes not absorbing and not excited depending upon the mass number of the isotopes, it is possible by the present invention to selectively ionize and separate the isotopes, which have the isotope shift equal to or smaller than the line width of the laser light and which have been difficult to separate in the past. The selective excitation and ionization according to the angular momentum selection rule are carried out by 3-step excitation, and 3 excited wavelengths are generated by two or more lasers pumped by the light from the same pumping light source. Also, the optical paths for these lights are made to be in same length by optical delay circuit. Thus, it is possible to perform selective excitation and ionization even when laser light source is pulse operating. Because the laser light of the first circularly-polarized light and the laser light of the second circularly-polarized light are irradiated from opposite directions on the substance containing the gasified isotopes, Doppler effects of the moving atoms can be canceled each other vector-wise, and the separation efficiency is increased. There is no need to optically overlap both lights in advance, and the laser light circularly-polarized with high efficiency can be utilized.

The present invention is particularly effective for the separation and purification of palladium. In the practical application, the only radioactive palladium isotope with mass number 107 can be separated from the palladium contained in the insoluble residue from the reprocessing of spent fuel, and the non-radioactive palladium with even mass number, which has been handled as waste in the past, can be separated and utilized as precious metal.

What we claim is:

1. A laser isotope separation apparatus used for isotopes having an isotope shift which is not greater than a line width of laser light, comprising:
    gasification means for gasifying a substance containing isotopes,
    first excitation means providing irradiated laser light of a first wavelength, for exciting the isotopes to a first excited level,
    second excitation means providing irradiated laser light of a second wavelength, for exciting isotopes excited by the laser light of the first wavelength to a second excited level,
    ionization means providing irradiated laser light of a third wavelength to ionize the isotopes at the second excited level,
    separation means for separating ionized isotopes from neutral isotopes, said separation means including electrodes applied with an electromagnetic field,
    light pumping means for pumping at least two different leasers,
    wave conversion means for producing a non-linear optical effect for converting wavelength of light from at least one of said lasers, said wave conversion means including first and second circular polarization converters, wherein the laser light of said first wavelength is converted to circularly polarized light having a first optical path by said first circular polarization converter, and said laser light of said second wavelength having a second optical path is converted to circularly light by said second circular polarization converter,
    optical circuit means for delaying said circularly polarized laser light in at least one of said first and second optical paths such that said first and second wavelengths are made to be the same length,
    wherein said first circularly polarized laser light and said second circularly polarized laser light are irradiated on said gasified substance from opposite directions.

2. A laser isotope separation apparatus as set forth in claim 1, wherein the laser light with the third wavelength is generated by a third laser different from the first and second lasers.

3. A laser isotope separation apparatus as set forth in claim 1 or 2, further comprising a ring dye laser having a line width narrower than an isotope shift between the isotopes contained in said substance in order to separate the isotopes with different mass numbers, wherein light from said ring dye laser is amplified by one of said laser, and the light is used as the laser light of said first or said second wavelength by converting or without converting the wavelength by non-linear optical effect.

4. A laser isotope separation apparatus as set forth in claim 1, wherein the substance containing isotopes is palladium and said second excitation means also serves as said ionization means.

5. A laser isotope separation apparatus as set forth in claim 9, wherein said pumping light means ia a pulse operating YAG laser emitting light with wavelength of 1064 nm, the first laser is pumped by converting the wavelength of $\frac{1}{2}$, i.e. to 532 nm, by non-linear optical effect, light with wavelength of 552.6 nm is oscillated from the first laser and this light is used as the laser light of the first wavelength by converting the light to $\frac{1}{2}$ of the wavelength, i.e. to 276.3 nm, by non-linear optical effect, the second laser is pumped by converting the laser light from said pulse operation YAG laser to $\frac{1}{3}$ of the wavelength, i.e. 355 nm, by non-linear optical effect, and light with wavelength of 521 nm is oscillated from the second laser and the light is used as the laser light of the second and the third wavelengths.

* * * * *